(12) United States Patent
Kim et al.

(10) Patent No.: US 9,447,252 B2
(45) Date of Patent: Sep. 20, 2016

(54) POLYPROPYLENE-BASED RESIN COMPOSITION AND METHOD FOR MANUFACTURING POLYPROPYLENE COMPOSITE MATERIAL

(71) Applicants: Hyundai Motor Company, Seoul (KR); Lotte Chemical Corporation, Seoul (KR)

(72) Inventors: Hak Soo Kim, Seoul (KR); Dae Sik Kim, Gyeonggi-Do (KR); Jung Gyun Noh, Gyeonggi-Do (KR); Hyung Shin Lee, Daejeon (KR); Byung Kook Nam, Daejeon (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 0 days.

(21) Appl. No.: 14/569,638

(22) Filed: Dec. 13, 2014

(65) Prior Publication Data
US 2016/0002436 A1    Jan. 7, 2016

(30) Foreign Application Priority Data
Jul. 7, 2014    (KR) .................... 10-2014-0084813

(51) Int. Cl.
*C08K 3/22* (2006.01)
*B29C 44/00* (2006.01)
*C08J 9/00* (2006.01)
*C08J 9/12* (2006.01)

(52) U.S. Cl.
CPC ................. *C08K 3/22* (2013.01); *B29C 44/00* (2013.01); *C08J 9/0066* (2013.01); *C08J 9/125* (2013.01); *C08J 2323/10* (2013.01); *C08J 2423/16* (2013.01); *C08K 2003/2224* (2013.01); *C08K 2003/2227* (2013.01)

(58) Field of Classification Search
None
See application file for complete search history.

(56) References Cited

U.S. PATENT DOCUMENTS

| 4,987,173 A | * | 1/1991 | Nomura | C08K 7/08 524/423 |
| 5,143,965 A | * | 9/1992 | Mertz | C01F 5/14 106/461 |

(Continued)

FOREIGN PATENT DOCUMENTS

| JP | 2000-103910 A | 4/2000 |
| KR | 10-2003-0046084 | 6/2003 |

(Continued)

*Primary Examiner* — Satya Sastri
(74) *Attorney, Agent, or Firm* — Mintz Levin Cohn Ferris Glovsky and Popeo, P.C.; Peter F. Corless

(57) ABSTRACT

The present invention relates to a polypropylene-based resin composition including: (A) a polypropylene resin in an amount of about 40 to 90 wt %, (B) a metal hydroxide in an amount of about 1 to about 25 wt %, (C) an inorganic filler in an amount of about 5 to about 15 wt %, and (D) a polyolefin-based elastomer in an amount of about 0 to about 20 wt %, and a method for manufacturing the polypropylene-based resin composition.

Accordingly, the polypropylene-based resin composition may be applied widely to a molded product of interior or exterior parts of a vehicle because a polypropylene resin composition containing a metal hydroxide may be used to manufacture interior and exterior products of a vehicle, thereby achieving weight reduction due to excellent foaming quality during the foaming injection and improved mechanical properties.

11 Claims, 2 Drawing Sheets

(56) References Cited

U.S. PATENT DOCUMENTS

| | | | |
|---|---|---|---|
| 5,214,084 A * | 5/1993 | Ishii | C08K 3/0033 524/100 |
| 7,790,795 B2 * | 9/2010 | Schauder | C08F 255/00 524/442 |
| 8,525,028 B2 | 9/2013 | Cree et al. | |
| 9,139,725 B2 * | 9/2015 | Noh | C08L 23/14 |
| 2011/0206922 A1 | 8/2011 | Kawamura et al. | |

FOREIGN PATENT DOCUMENTS

| | | |
|---|---|---|
| KR | 10-2007-0117410 A | 12/2007 |
| KR | 10-2010-0077791 A | 7/2010 |
| KR | 10-2013-0053648 A | 5/2013 |
| KR | 2014-0060129 A | 5/2014 |
| WO | 2008/078406 A1 | 7/2008 |

* cited by examiner

POLYPROPYLENE-BASED RESIN COMPOSITION AND METHOD FOR MANUFACTURING POLYPROPYLENE COMPOSITE MATERIAL

CROSS-REFERENCE TO RELATED APPLICATION

This application claims under 35 U.S.C. §119(a) the benefit of Korean Patent Application No. 10-2014-0084813 filed on Jul. 7, 2014, the entire contents of which are incorporated herein by reference.

TECHNICAL FIELD

The present disclosure relates to a polypropylene-based resin composition for foam injection. The polypropylene-based resin composition may contain a metal hydroxide thereby providing sufficient mechanical properties, such interior or exterior products of a vehicle may be manufactured from the composition. In addition, weight of the products manufactured from the polypropylene-based resin composition may be reduced by improving the foam quality during a foam injection. The present invention also relates to a method for manufacturing polypropylene composite material using the polypropylene-based resin composition.

BACKGROUND

In general, interior materials of a vehicle may be required to have reduced weight properties and high rigidity, dimensional stability, moldability, low manufacturing cost, and the like. Further, reduced weight and recyclability of vehicle parts may have greater significance due to recent enforcement of environmental regulations on vehicles, the depletion of petroleum resources, and the like.

The interior materials of a vehicle may be used for a door trim, a filler, a door scope, a package tray, and the like, and these interior materials may vary in the material and constitution thereof depending on types of vehicle. Meanwhile, a rigid substrate in the constitution has been typically manufactured by an injection molding process using a polypropylene composite resin. The rigid substrate for the vehicle interior materials manufactured by injection molding may have improved rigidity and recyclability, but may have a limitation on weight reduction, and sink marks and the like may be generated on the surface of the molded product, thereby deteriorating marketability thereof.

Polypropylene resins are a typically used plastic having a substantially greater strength than those of other resins, and improved mechanical properties and recyclability, and these characteristics may be due to crystallinity of the polypropylene molecules and the molecular structure of the polymer chains. Furthermore, the polypropylene resins may have substantial resistance to deformation at elevated temperatures and have substantial tensile strength and surface rigidity, and further a polypropylene composite resin may be manufactured with further improved physical properties by using an impact modifier or an inorganic filler for reinforcement according to the use thereof.

While having these excellent physical properties, the polypropylene resins may have less foamability than other resins due to weak melt tension due to linear chain structure thereof, and thus production of a foam body may be limited. In general, when the melt tension is low, cell walls which separate gas may not be strong enough to overcome the tension such that cell walls may be easily collapsed and ruptured. Therefore, the foamed product may have a high ratio of collapsed cells and the cell structure may not be controlled, thereby deteriorating moldability thereof.

In the related arts, a material for foam injection has been developed and the material may be manufactured by using a high-impact propylene resin, rubber, and an inorganic filler. However, expansion ratios of the material may not be sufficient and the process costs may increase because an expensive chemical foaming agent is used for foaming, or conditions for physical foaming process may not be controlled easily.

In other related arts, a modified polypropylene resin composition with improved bubbling property and a foam body prepared by using the modified polypropylene resin composition have been introduce. The polypropylene composite resins, however, fail to have a sufficient degree of crosslinking, and thus, industrialization of the resins has not been achieved. Moreover, industrial advantages have not been provided because the produced foam body may need to be compressed repeatedly and formed to make an interior material of a vehicle.

As such, there is an unmet need for developing a rigid substrate for interior and exterior materials of a vehicle, which may improve physical properties such as high rigidity and a light weight.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides technical solutions to technical difficulties as described above in the related arts. For example, when interior and exterior products for a vehicle are manufactured, by using a polypropylene resin composition including a metal hydroxide of the present invention, the foaming quality during the foaming injection may be improved in addition to improvement in mechanical properties, and accordingly, weight of the products may be reduced substantially.

In one aspect, the present invention provides a polypropylene-based resin composition. In another aspect, a method for manufacturing a polypropylene composite material using the polypropylene-based resin composition of the invention.

In an exemplary embodiment, a polypropylene-based resin composition may include: (A) a polypropylene resin in an amount of about 40 to about 90 wt % based on the total weight of the polypropylene-based resin composition; (B) a metal hydroxide in an amount of about 1 to about 25 wt % based on the total weight of the polypropylene-based resin composition; (C) an inorganic filler in an amount of about 5 to about 15 wt % based on the total weight of the polypropylene-based resin composition; and (D) a polyolefin-based elastomer in an amount of about 0 to about 20 wt % of, based on the total weight of the polypropylene-based resin composition.

In addition, in an exemplary embodiment, the polypropylene-based resin composition may consist essentially of, or consist of: (A) a polypropylene resin in an amount of about 40 to about 90 wt % based on the total weight of the polypropylene-based resin composition; (B) a metal hydroxide in an amount of about 1 to about 25 wt % based on the total weight of the polypropylene-based resin composition; (C) an inorganic filler in an amount of about 5 to about 15 wt % based on the total weight of the polypropylene-based resin composition; and (D) a polyolefin-based elastomer in an amount of about 0 to about 20 wt % based on the total weight of the polypropylene-based resin composition.

It is understood that weight percent (wt %) of each component as disclosed herein is based on total weight of the polypropylene-based resin composition, unless otherwise indicated.

In an exemplary embodiment, a method for manufacturing a polypropylene composite material is provided. The method may include: (i) mixing a polypropylene resin in an amount of about 40 to about 90 wt %, a metal hydroxide in an amount of about 1 to about 25 wt % of, an inorganic filler in an amount of about 5 to about 15 wt %, and a polyolefin-based elastomer in an amount of about 0 to about 20 wt % of; and (ii) melting and extruding the resulting mixture.

In still another aspect, the present invention provides a molded product used for interior or exterior parts of a vehicle. The molded product which is manufactured from the method of the present invention may have reduced weight. The molded product may be manufactured using a polypropylene-based resin composition as disclosed herein.

In another aspect, the invention includes a vehicle such as an automobile comprising a molded product as disclosed herein.

The polypropylene resin composition according to various exemplary embodiments of the present invention may include a metal hydroxide. In particular, the metal hydroxide may release moisture during an injection molding process thereby providing a material for interior or exterior parts of the vehicle, which may have reduced weight due to improved mechanical properties and foaming quality obtained from the composition of the invention. In addition, content of an expensive chemical foaming agent may be reduced in the polypropylene-based resin composition of the invention.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
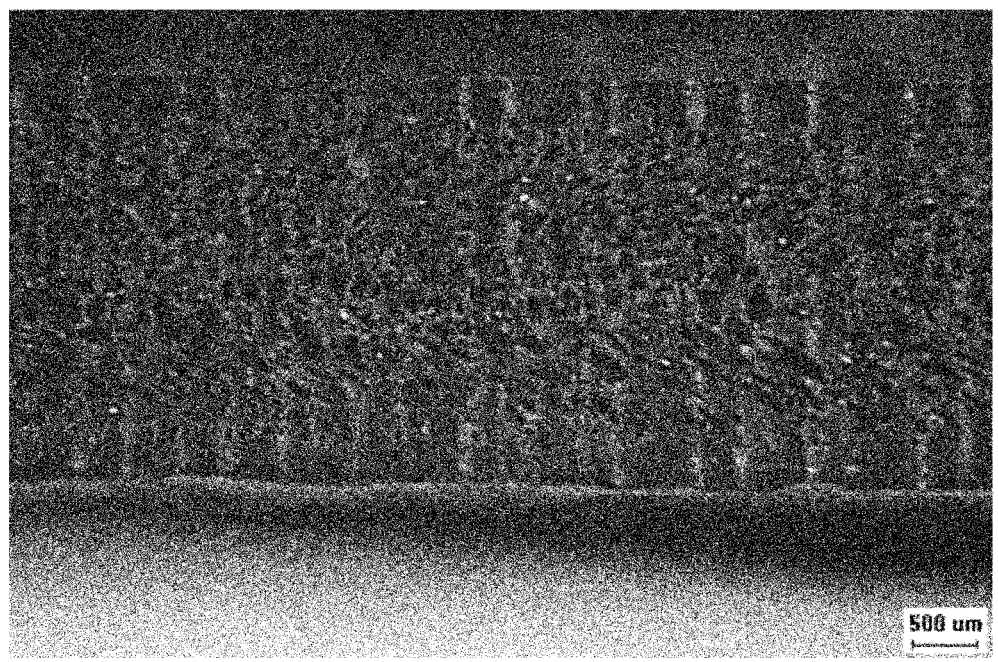
FIG. 1 shows a photographic view of an exemplary test specimen prepared in Example 1 according to an exemplary embodiment of the present invention, which is taken by an optical microscope.
Figure 2:
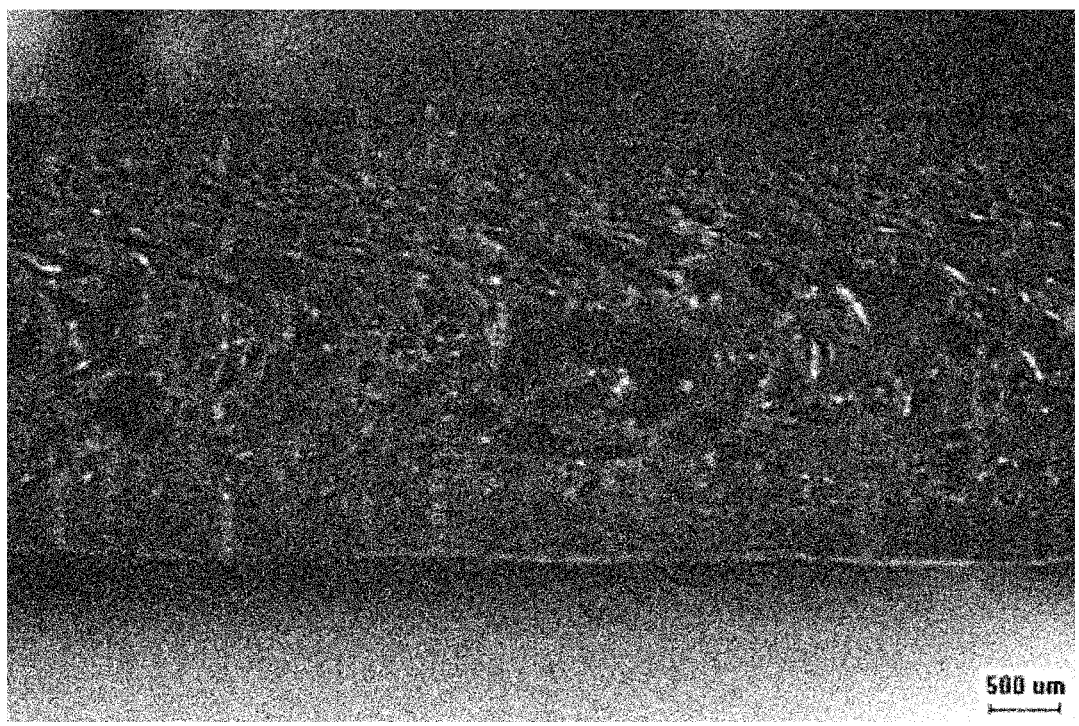
FIG. 2 shows a photographic view of an exemplary test specimen prepared in Comparative Example 1 in the related arts, which is taken by an optical microscope.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail.

In an exemplary embodiment, the polypropylene-base resin composition may include: (A) a propylene resin in an amount of about 40 to about 90 wt %; (B) a metal hydroxide in an amount of about 1 to about 25 wt %; (C) an inorganic filler in an amount of about 5 to about 15 wt % of; and (D) a polyolefin-based elastomer in an amount of about 0 to about 20 wt %, based on the total weight of the present invention.

The polypropylene resin (A), as used herein, may include one or more of a random copolymer, and a block copolymer. In particular, the random copolymer may be obtained by polymerizing a co-monomer which may be selected from the group consisting of homo-polypropylene (homo-PP), propylene, ethylene, butylene, and octane, and the block copolymer may be obtained by blending an ethylene-propylene rubber with polypropylene.

In addition, the polypropylene resin may include a propylene mono polymer, a copolymer of propylene with an amount of about 12 mol % or less of ethylene or a copolymer of propylene with C4 to C10 olefin-based monomer. Particularly, the polypropylene resin may be a copolymer of propylene with ethylene in an amount of about 12 mol % or less based on the total copolymer.

When a propylene mono polymer, a copolymer of propylene with ethylene in an amount of about 12 mol % or less or a copolymer of propylene with C4 to C10 olefin-based monomer is used in a polypropylene resin, the polypropylene resin composition may provide improved rigidity and impact resistance. Particularly, when a copolymer of propylene with ethylene in an amount of about 10 mol % or less is used, foaming characteristics may be substantially improved due to reduced phase separation of the polypropylene resin.

The polypropylene resin in an amount of 40 to 90 wt % may be included in the polypropylene-base resin composition, based on the total weight of the composition. When the content of the polypropylene resin is less than about 40 wt %, moldability may deteriorate during the injection, and when the content is greater than about 90 wt %, dimensional stability, heat resistance and the like may deteriorate. Accordingly, the content of polypropylene resin may be used in an amount of 40 to 90 wt % for polypropylene-base resin composition.

The metal hydroxide (B), as used herein, may be selected the group consisting of aluminum hydroxide ($Al(OH)_3$), magnesium hydroxide ($Mg(OH)_2$), and a mixture thereof. Further, the metal hydroxide may have an average particle diameter of about 0.2 to about 200 μm in the form of a plate. In particular, the average particle diameter may be in a range from about 1 to about 100 μm. When the average particle diameter is less than about 0.2 μm, productivity and economic efficiency of a polypropylene composite material may be reduced, and when the average particle diameter is greater than about 200 μm, foaming characteristics of a polypropylene composite material may deteriorate due to a reduction in moisture release capability. Accordingly, the content of the metal hydroxide may be used within the above-range for polypropylene-base resin composition.

In particular, since the metal hydroxide releases moisture during the injection molding process, a material having improved mechanical characteristics and foaming quality may be provided. Moreover, the material may have reduced weight and reduced amount of an expensive chemical foaming agent may be used. Further, when the metal hydroxide has a plate-like structure, collapsing a cell may be prevented during the foam formation, thereby improving cell formation and also enhancing mechanical properties thereof. The following equations show an exemplary metal hydroxide cleavage mechanism according to an exemplary embodiment of the present invention.

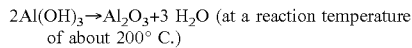
$2Al(OH)_3 \rightarrow Al_2O_3 + 3 H_2O$ (at a reaction temperature of about 200° C.)

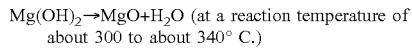
$Mg(OH)_2 \rightarrow MgO + H_2O$ (at a reaction temperature of about 300 to about 340° C.)

Particularly, the metal hydroxide in an amount of about 1 to about 25 wt % may be included in the polypropylene-base resin composition, based on the total weight of the composition. When the content of the metal hydroxide is less than about 1 wt %, foamability may deteriorate because the amount of moisture released from the metal hydroxide is not sufficient, and when the content is greater than about 25 wt %, foamability may deteriorate because substantially excessive moisture is released. Accordingly, the metal hydroxide may be used within the above-described range for polypropylene-base resin composition of the present invention.

The inorganic filler (C), as used herein, may reinforce rigidity and enhance foamability. The inorganic filler may be one or more selected from the group consisting of talc, calcium carbonate, calcium sulfate, magnesium oxide, calcium stearate, wollastonite, mica, silica, calcium silicate, clay, whisker, and carbon black. In addition, the composition of the invention may include the inorganic filler such as talc or whisker, which may substantially improve rigidity and hardness according to increase in the content thereof.

The inorganic filler may have an average particle diameter of about 1 to about 4 μm. When the diameter is less than about 1 μm, processability and economic efficiency may decrease, and when the diameter is greater than about 4 μm, filler dispersibility may deteriorate. Accordingly, the particle size of the inorganic filler may be in above-described range for polypropylene-base resin composition of the present invention.

Particularly, the inorganic filler in an amount of about 5 to 15 wt % may be included in the polypropylene-base resin composition, based on the total weight of the composition. When the content of the inorganic filler is less than about 5 wt %, dimensional stability and mechanical rigidity may not be obtained sufficiently, when the content is greater than about 15 wt %, the density may increase. Accordingly, the inorganic filler may be included in the polypropylene-base resin composition within the above-described range for polypropylene-base resin composition of the present invention.

The polyolefin-based elastomer, as used herein, may be a thermoplastic elastomer rubber, and a copolymer of ethylene and a C2 to C10 α-olefin may be used as the polyolefin-based elastomer without limitation to the constitution of the α-olefin. In particular, polyolefin-based elastomer may be propylene, butene, pentene, hexene, protene, octene, and the like. In addition, the thermoplastic elastomer rubber may be a thermoplastic elastomer rubber including one or more selected from the group consisting of ethylene-propylene rubber (EPR), ethylene-propylene-diene rubber (EPDM), ethylene-butene copolymer (EBR), ethylene-octene copolymer (EOR), and styrene-butadiene (SBR).

For example, the ethylene-octene copolymer (EOR) may be used as the polyolefin-based elastomer, since an octene group thereof having long-side chains may improve impact strength substantially while the reduction in rigidity may be minimized. Furthermore, like the ethylene-butene copolymer, a copolymer containing a butene CO-monomer in a content of 50% or greater thereof may be used, Other exemplary polyolefin-based elastomer may be an ethylene-butene copolymer (EBR) having a melt index of about 0.5 to about 150 g/10 min at a temperature of about 190° C. and 2.6 kgf and a density of about 0.868 to about 0.885 g/cc.

The polyolefin-based elastomer in an amount of about 0 to about 20 wt % may be included in the polypropylene-base resin composition, based on the total weight of the composition. The amount of the polyolefin-based elastomer may be controlled for the purpose of the molded product to be manufactured. When the content of the polyolefin-based elastomer is greater than about 20 wt %, heat resistance may be reduced and flowability may increase. Accordingly, the polyolefin-based elastomer may be used within the above-described range for polypropylene-base resin composition of the present invention.

The polypropylene-based resin composition according to various exemplary embodiments of the present invention may further include one or more additives such as an antioxidant, a UV stabilizer, a flame retardant, a coloring agent, a plasticizer, a thermal stabilizer, and a slip agent. The content of each additive may be determined according to a known range as generally used for preparing a polypropylene composite material, and the amount of each additive may be adjusted to an optimal range and used in consideration of the overall amount of preparation, the preparation process and the like.

The additive may be added in a step of mixing polypropylene, an inorganic filler, and a polypropylene-based compatibilizer, and may also be added while being kneaded in a separate addition step.

The present invention provides a method for manufacturing a polypropylene composite material. The method may include: (i) mixing a polypropylene resin in an amount of about 40 to about 90 wt %, a metal hydroxide in an amount of about 1 to about 25 wt %, an inorganic filler in an amount of about 5 to about 15 wt %, and a polyolefin-based elastomer in an amount of about 0 to about 20 wt %; and (ii) melting and extruding the resulting mixture.

In the step (i) of an exemplary method, a mixture may be prepared by using the composition and the content as described above.

In the step (ii) of melting and extruding the resulting mixture, a dual or more screw extruder may be used. For example, among the extrusion conditions, the melting and extruding step may be performed with a screw revolution speed of about 200 to about 1,000 rpm and a residence time for about 5 to about 90 seconds. In particular, the screw revolution speed may be from about 300 to about 800 rpm, and the residence time may be for about 10 to about 60 seconds.

The screw revolution speed may be about 300 rpm or greater when a shear flow and an elongational flow is induced sufficiently for kneading between resins and dispersion of the inorganic filler in an extruder. Meanwhile, the screw revolution speed may be about 1,000 rpm or less thereby preventing the polypropylene and the metal hydroxide from deteriorating.

Moreover, when the residence time is less than about 5 seconds, each composition may not be sufficiently kneaded, and when the residence time is greater than about 90 seconds, deterioration may occur and the efficiency of enhancing the productivity may decrease. Accordingly, the residence time may be within the above-described range.

In various exemplary embodiments of the present invention, the polypropylene-based resin composition may be widely applied to molded products of interior or exterior parts of a vehicle. Particularly, the molded products may have reduced weight due to improvements in the foaming quality during the foaming injection and mechanical properties by using a polypropylene-based resin composition, which may include a metal hydroxide.

Hereinafter, the following Examples are provided to exemplify the present invention, however the scope of the present invention is not limited thereto.

EXAMPLES

The following examples illustrate the invention and are not intended to limit the same.

Example 1

The polypropylene-based resin composition components were mixed according to the contents as shown in Table 1. A twin screw extruder having screw diameter of 30 mm and L/D 40 was used to prepare a polypropylene-based composite material under extrusion conditions at an extrusion temperature of about 160 to about 200° C. and at a screw revolution speed of about 400 rpm. Subsequently, an injection molding machine was used to form an exemplary test specimen. In Example 1, about 3 phr of a foaming agent was added.

Examples 2 to 5

Preparation was performed under the conditions as described in Example 1, and test specimens were formed by mixing the components in the contents as shown in Table 1.

Comparative Examples 1 and 2

Preparation was performed under the conditions as described in Example 1, except a metal hydroxide. Test specimens were formed by mixing the components in the contents as shown in Table 1.

Comparative Example 3

Preparation was performed under the conditions as described in Example 1, except a metal hydroxide. A test specimen was formed by mixing the components in the contents as shown in Comparative Example 1 of Table 1, except that 10 phr of a foaming agent was used.

TABLE 1

Polypropylene resin composition components and contents

| Component | Example 1 | Example 2 | Example 3 | Example 4 | Example 5 | Comparative Example 1 | Comparative Example 2 | Comparative Example 3 |
|---|---|---|---|---|---|---|---|---|
| Polypropylene[1)] | 85 | 80 | 80 | 85 | 80 | 85 | 80 | 85 |
| Metal hydroxide A[2)] | 5 | 10 | — | — | 5 | — | — | — |
| Metal hydroxide B[3)] | — | — | 10 | 5 | 5 | — | — | — |
| Inorganic filler[4)] | 10 | 10 | 10 | 10 | 10 | 15 | 20 | 15 |
| Polyolefin-based elastomer | — | — | — | — | — | — | — | — |

The polypropylene was purchased from Lotte Chemical Corporation, South Korea, (catalog No. JM-370). The metal hydroxide A as used in Table 1 was $Mg(OH)_2$ purchased from Nuovasima, Japan; and the metal hydroxide B as used in Table 1 was $AL(OH)_3$ purchased from Sumitomo Corp., Japan; and the inorganic filler in Table 1 was talc purchased from KOCH, USA.

Each evaluation of physical properties was performed on each test specimen in Examples 1-5 and Comparative Examples 1-3 as described below.

(1) Tensile strength (Yield) was measured in accordance with the standard ASTM evaluation method D638.

(2) Flexural modulus was measured in accordance with the standard ASTM evaluation method D790.

(3) IZOD impact strength was measured in accordance with the standard ASTM evaluation method D256.

(4) Heat deflection temperature was measured in accordance with the standard ASTM evaluation method D648.

(5) Average diameter of foaming cells was measured in a 1×1 cm range by using an optical microscope.

Furthermore, the polypropylene composite material of the present invention may have a flexural modulus of about 10,000 kg/cm² or greater, or particularly of about 15,000 kg/cm² or greater measured by the ASTM evaluation method D790, a tensile strength of about 100 kg/cm² or greater, or particularly about of about 200 kg/cm² or greater measured by the ASTM evaluation method D638, and a heat deflection temperature of about 80° C. or greater, or particularly of about 110° C. or greater measured by the ASTM evaluation method D648.

TABLE 2

Results of measurement of physical properties

| | Classification | Unit | Example 1 | Example 2 | Example 3 | Example 4 | Example 5 | Comparative Example 1 | Comparative Example 2 | Comparative Example 3 |
|---|---|---|---|---|---|---|---|---|---|---|
| Physical properties | Tensile strength (Yield) | Kg/cm² | 210 | 225 | 200 | 215 | 220 | 160 | 180 | 170 |
| | Flexural modulus | Kg/cm² | 23,300 | 25,000 | 22,600 | 24,100 | 23,100 | 20,600 | 21,100 | 18,000 |
| | IZOD Impact strength (23° C.) | kg · cm | 23 | 29 | 17 | 13 | 20 | 17 | 13 | 4 |
| | Heat deflection temperature | ° C. | 123 | 135 | 125 | 127 | 120 | 125 | 127 | 98 |
| | Average diameter of foaming cells | µm | 50 | 45 | 70 | 100 | 60 | 250 | 245 | 55 |

As shown in Table 1, Examples 1 to 5 where polypropylene resin compositions contain a metal hydroxide, uniform foaming cells were formed as compared to Comparative Examples 1 and 2 where a metal hydroxide is not used. In particular, tensile strength, flexural modulus, impact strength, heat deflection temperature, foaming cell size and the like have been improved in Examples 1-5. In addition, as the content of the metal hydroxide increases, mechanical properties and foaming characteristics are improved.

Comparative Example 3 is a test specimen prepared by using the components as in Comparative Example 1, and when the content of the foaming agent is substantially greater than a predetermined amount, the average diameter of cells is equal/similar to that in Example 1, but mechanical properties of the product deteriorated.

Therefore, the polypropylene-based resin composition including the metal hydroxide according to various exemplary embodiments of the present invention may provide weight reduction of molded products for interior and exterior of the vehicle due to excellent foaming quality and improved mechanical properties.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene-based resin composition, comprising:
  (A) a polypropylene resin in an amount of about 40 to about 90 wt % based on the total weight of the polypropylene-based resin composition;
  (B) a metal hydroxide in an amount of about 1 to about 25 wt % based on the total weight of the polypropylene-based resin composition;
  (C) an inorganic filler in an amount of about 5 to about 15 wt % based on the total weight of the polypropylene-based resin composition; and
  (D) a polyolefin-based elastomer in an amount of about 0 to about 20 wt % based on the total weight of the polypropylene-based resin composition,
  wherein the metal hydroxide is aluminum hydroxide (Al(OH)₃) which has an average particle diameter of about 0.2 to about 200 µm in a form of a plate.

2. The polypropylene-based resin composition of claim 1, wherein the polypropylene resin includes a homo-polypropylene (homo-PP), a random copolymer, a block copolymer or mixtures thereof, wherein the random copolymer is obtained by polymerizing a co-monomer selected from the group consisting of propylene, ethylene, butylene, and octene, and the block copolymer is obtained by polymerizing an ethylene-propylene rubber with polypropylene.

3. The polypropylene-based resin composition of claim 1, wherein the inorganic filler is one or more selected from the group consisting of talc, calcium carbonate, calcium sulfate, magnesium oxide, calcium stearate, wollastonite, mica, silica, calcium silicate, clay, whisker, and carbon black.

4. The polypropylene-based resin composition of claim 1 that consists essentially of the polypropylene resin, the metal hydroxide, the inorganic filler and the polyolefin elastomer.

5. The polypropylene-based resin composition of claim 1 that consists of the polypropylene resin, the metal hydroxide, the inorganic filler and the polyolefin elastomer.

6. The polypropylene-based resin composition of claim 1, wherein polyolefin-based elastomer is selected from the group consisting of ethylene-propylene rubber (EPR), ethylene-propylene-diene rubber (EPDM), ethylene-butene copolymer (EBR), ethylene-octene copolymer (EOR), and styrene-butadiene (SBR).

7. A method for manufacturing a polypropylene composite material, comprising:
  (i) mixing a polypropylene resin in an amount of about 40 to 90 wt %, a metal hydroxide in an amount of about 1 to about 25 wt % based on the total weight of the polypropylene-based resin composition, an inorganic filler in an amount of about 5 to about 15 wt % based on the total weight of the polypropylene-based resin composition, and a polyolefin-based elastomer in an amount of about 0 to about 20 wt % of based on the total weight of the polypropylene-based resin composition; and
  (ii) melting and extruding a resulting mixture, wherein the metal hydroxide is aluminum hydroxide (AL(OH)3) which has an average particle diameter of about 0.2 to about 200 μm in a form of a plate.

8. The method of claim 7, wherein among extrusion conditions in step (ii), a screw revolution speed is in a range of about 200 to about 1,000 rpm and a residence time is for about 5 to about 90 seconds.

9. A molded product for interior or exterior part of a vehicle manufactured by the method of claim 7.

10. A molded product for interior or exterior part of a vehicle manufactured from the polypropylene-based resin composition of claim 1.

11. A vehicle comprising the molded product of claim 10.

* * * * *